(12) United States Patent
Mehta et al.

(10) Patent No.: US 7,781,097 B2
(45) Date of Patent: Aug. 24, 2010

(54) CELL THERMAL RUNAWAY PROPAGATION RESISTANCE USING AN INTERNAL LAYER OF INTUMESCENT MATERIAL

(75) Inventors: Vineet Haresh Mehta, Mountain View, CA (US); Alex Prilutsky, San Mateo, CA (US); Weston Arthur Hermann, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 12/592,558

(22) Filed: Nov. 25, 2009

(65) Prior Publication Data

US 2010/0075221 A1    Mar. 25, 2010

Related U.S. Application Data

(63) Continuation of application No. 12/625,665, filed on Nov. 25, 2009, which is a continuation-in-part of application No. 12/460,423, filed on Jul. 17, 2009, now Pat. No. 7,736,799, which is a continuation of application No. 12/504,712, filed on Jul. 17, 2009, now Pat. No. 7,749,647.

(51) Int. Cl.
*H01M 2/00*    (2006.01)

(52) U.S. Cl. .................. 429/163; 429/120; 429/176

(58) Field of Classification Search .................. 429/178, 429/246, 120, 163, 175, 176
See application file for complete search history.

(56) References Cited

U.S. PATENT DOCUMENTS

| 4,137,376 A | 1/1979 | Clegg et al. |
| 4,483,908 A | 11/1984 | Zimmerman |
| 6,127,064 A | 10/2000 | Shibata et al. |
| 6,146,785 A | 11/2000 | Rigobert et al. |
| 6,706,446 B2 | 3/2004 | Nakai et al. |

FOREIGN PATENT DOCUMENTS

| EP | 807984 A1 | 11/1997 |
| JP | 2002298793 A | 10/2002 |

OTHER PUBLICATIONS

Berdichevsky et al., The Tesla Roadster Battery System, http://www.teslamotors.com/display_data/TeslaRoadsterBatterySystem.pdf, Aug. 16, 2006, pp. 1-5.

*Primary Examiner*—Gregg Cantelmo
(74) *Attorney, Agent, or Firm*—Patent Law Office of David G. Beck

(57) ABSTRACT

A means for inhibiting the propagation of thermal runaway within a plurality of batteries is provided, wherein the means is comprised of at least one layer of intumescent material interposed between the interior surface of the casing of a battery and the corresponding electrode assembly.

11 Claims, 7 Drawing Sheets

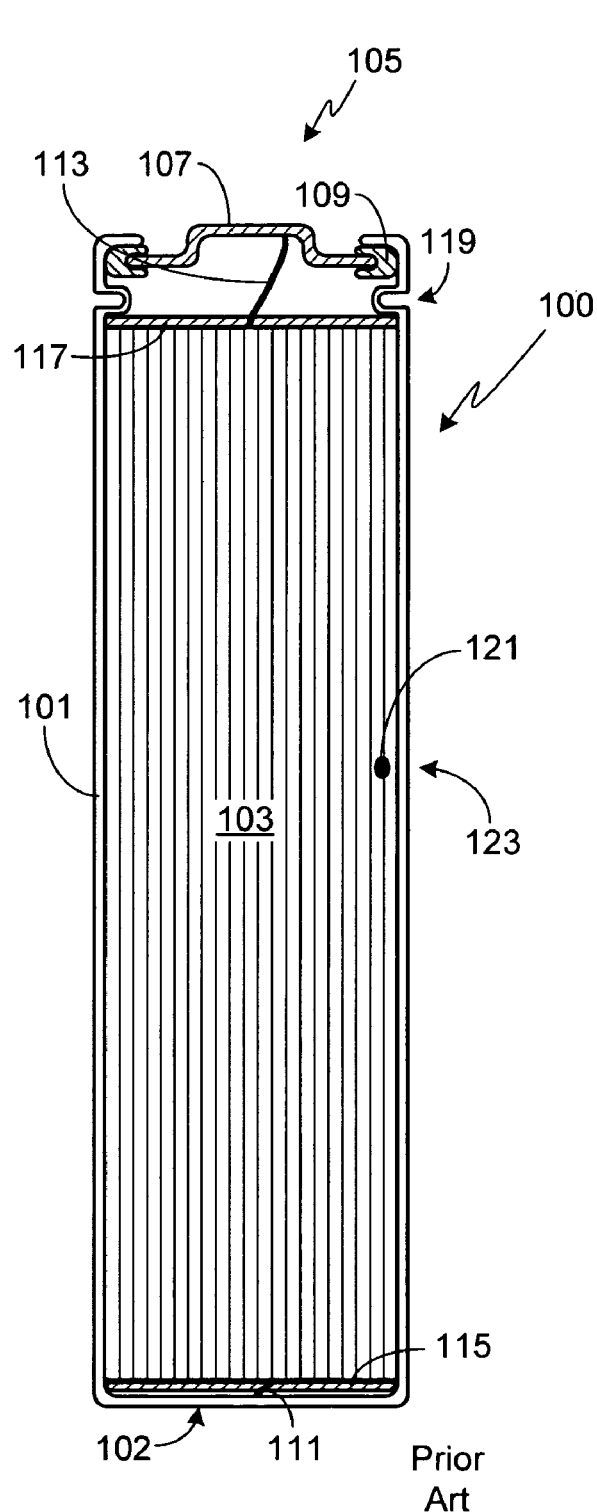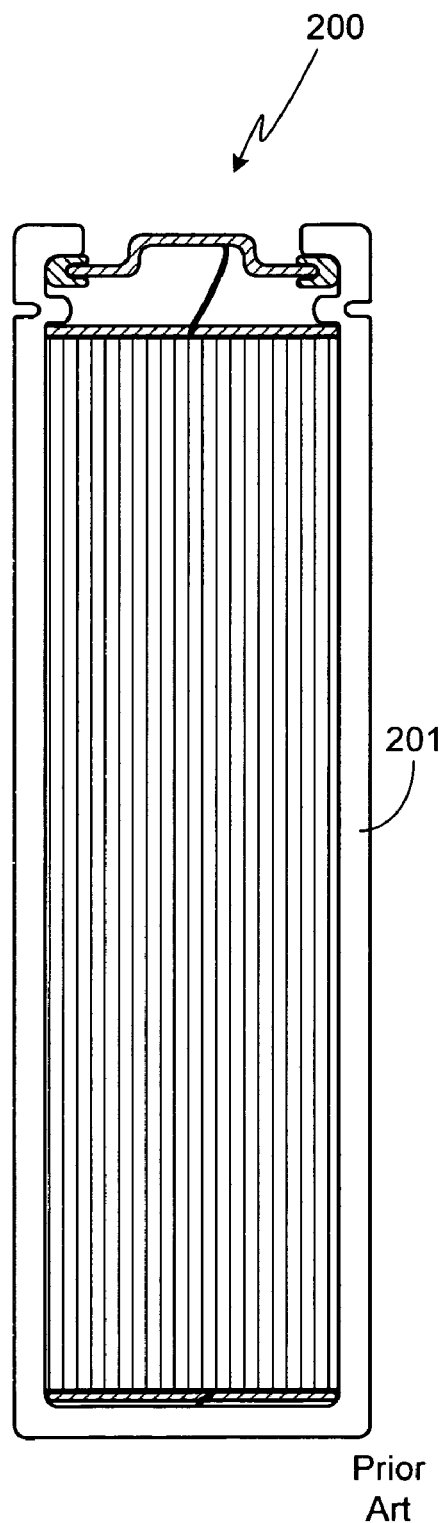
FIG. 1     Prior Art
FIG. 2     Prior Art

CELL THERMAL RUNAWAY PROPAGATION RESISTANCE USING AN INTERNAL LAYER OF INTUMESCENT MATERIAL

CROSS-REFERENCES TO RELATED APPLICATIONS

This application is a continuation of U.S. patent application Ser. No. 12/625,665, filed Nov. 25, 2009, which is a continuation-in-part of U.S. patent application Ser. No. 12/460,423, filed Jul. 17, 2009, now U.S. Pat. No. 7,736,799 issued on Jun. 15, 2010 which is a continuation of U.S. patent application Ser. No. 12/504,712, filed Jul. 17, 2009, now U.S. Pat. No. 7,749,647 issued on Jul. 6, 2010 the disclosures of which are incorporated herein by reference for any and all purposes.

FIELD OF THE INVENTION

The present invention relates generally to batteries, and more particularly, to a means for minimizing the effects of cell thermal runaway.

BACKGROUND OF THE INVENTION

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery.

Although rechargeable batteries offer a number of advantages over disposable batteries, this type of battery is not without its drawbacks. In general, most of the disadvantages associated with rechargeable batteries are due to the battery chemistries employed, as these chemistries tend to be less stable than those used in primary cells. Due to these relatively unstable chemistries, secondary cells often require special handling during fabrication. Additionally, secondary cells such as lithium-ion cells tend to be more prone to thermal runaway than primary cells, thermal runaway occurring when the internal reaction rate increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

Thermal runaway is of major concern since a single incident can lead to significant property damage and, in some circumstances, bodily harm or loss of life. When a battery undergoes thermal runaway, it typically emits a large quantity of smoke, jets of flaming liquid electrolyte, and sufficient heat to lead to the combustion and destruction of materials in close proximity to the cell. If the cell undergoing thermal runaway is surrounded by one or more additional cells as is typical in a battery pack, then a single thermal runaway event can quickly lead to the thermal runaway of multiple cells which, in turn, can lead to much more extensive collateral damage. Regardless of whether a single cell or multiple cells are undergoing this phenomenon, if the initial fire is not extinguished immediately, subsequent fires may be caused that dramatically expand the degree of property damage. For example, the thermal runaway of a battery within an unattended laptop will likely result in not only the destruction of the laptop, but also at least partial destruction of its surroundings, e.g., home, office, car, laboratory, etc. If the laptop is on-board an aircraft, for example within the cargo hold or a luggage compartment, the ensuing smoke and fire may lead to an emergency landing or, under more dire conditions, a crash landing. Similarly, the thermal runaway of one or more batteries within the battery pack of a hybrid or electric vehicle may destroy not only the car, but may lead to a car wreck if the car is being driven, or the destruction of its surroundings if the car is parked.

One approach to overcoming this problem is by reducing the risk of thermal runaway. For example, to prevent batteries from being shorted out during storage and/or handling, precautions can be taken to ensure that batteries are properly stored, for example by insulating the battery terminals and using specifically designed battery storage containers. Another approach to overcoming the thermal runaway problem is to develop new cell chemistries and/or modify existing cell chemistries. For example, research is currently underway to develop composite cathodes that are more tolerant of high charging potentials. Research is also underway to develop electrolyte additives that form more stable passivation layers on the electrodes. Although this research may lead to improved cell chemistries and cell designs, currently this research is only expected to reduce, not eliminate, the possibility of thermal runaway.

FIG. 1 is a simplified cross-sectional view of a conventional battery 100, for example a lithium ion battery utilizing the 18650 form-factor. Battery 100 includes a cylindrical case 101, an electrode assembly 103, and a cap assembly 105. Case 101 is typically made of a metal, such as nickel-plated steel, that has been selected such that it will not react with the battery materials, e.g., the electrolyte, electrode assembly, etc. Typically cell casing 101 is fabricated in such a way that the bottom surface 102 is integrated into the case, resulting in a seamless lower cell casing. The open end of cell case 101 is sealed by a cap assembly 105, assembly 105 including a battery terminal 107, e.g., the positive terminal, and an insulator 109, insulator 109 preventing terminal 107 from making electrical contact with case 101. Although not shown, a typical cap assembly will also include an internal positive temperature coefficient (PTC) current limiting device, a current interrupt device (CID), and a venting mechanism, the venting mechanism designed to rupture at high pressures and provide a pathway for cell contents to escape. Additionally, cap assembly 105 may contain other seals and elements depending upon the selected design/configuration.

Electrode assembly 103 is comprised of an anode sheet, a cathode sheet and an interposed separator, wound together in a spiral pattern often referred to as a 'jellyroll'. An anode electrode tab 111 connects the anode electrode of the wound electrode assembly to the negative terminal while a cathode tab 113 connects the cathode electrode of the wound electrode assembly to the positive terminal. In the illustrated embodiment, the negative terminal is case 101 and the positive terminal is terminal 107. In most configurations, battery 100 also includes a pair of insulators 115/117. Case 101 includes a crimped portion 119 that is designed to help hold the internal elements, e.g., seals, electrode assembly, etc., in place.

In a conventional cell, such as the cell shown in FIG. 1, a variety of different abusive operating/charging conditions and/or manufacturing defects may cause the cell to enter into thermal runaway, where the amount of internally generated heat is greater than that which can be effectively withdrawn.

As a result, a large amount of thermal energy is rapidly released, heating the entire cell up to a temperature of 900° C. or more and causing the formation of localized hot spots where the temperature may exceed 1500° C. Accompanying this energy release is the release of gas, causing the gas pressure within the cell to increase.

To combat the effects of thermal runaway, a conventional cell will typically include a venting element within the cap assembly. The purpose of the venting element is to release, in a somewhat controlled fashion, the gas generated during the thermal runaway event, thereby preventing the internal gas pressure of the cell from exceeding its predetermined operating range.

While the venting element of a cell may prevent excessive internal pressure, this element may have little effect on the thermal aspects of a thermal runaway event. For example, if a local hot spot occurs in cell 100 at a location 121, the thermal energy released at this spot may be sufficient to heat the adjacent area 123 of the single layer casing wall 101 to above its melting point. Even if the temperature of area 123 is not increased beyond its melting point, the temperature of area 123 in concert with the increased internal cell pressure may quickly lead to the casing wall being perforated at this location. Once perforated, the elevated internal cell pressure will cause additional hot gas to be directed to this location, further compromising the cell at this and adjoining locations.

It should be noted that when a cell undergoes thermal runaway and vents in a controlled fashion using the intended venting element, the cell wall may still perforate due to the size of the vent, the material characteristics of the cell wall, and the flow of hot gas traveling along the cell wall as it rushes towards the ruptured vent. Once the cell wall is compromised, i.e., perforated, collateral damage can quickly escalate, due both to the unpredictable location of such a hot spot and due to the unpredictable manner in which such cell wall perforations grow and affect neighboring cells. For example, if the cell is one of a large array of cells comprising a battery pack, the jet of hot gas escaping the cell perforation may heat the adjacent cell to above its critical temperature, causing the adjacent cell to enter into thermal runaway. Accordingly, it will be appreciated that the perforation of the wall of one cell during thermal runaway can initiate a cascading reaction that can spread throughout the battery pack. Furthermore, even if the jet of hot gas escaping the cell perforation from the first cell does not initiate thermal runaway in the adjacent cell, it may still affect the health of the adjacent cell, for example by weakening the adjacent cell wall, thereby making the adjacent cell more susceptible to future failure.

As previously noted, cell perforations are due to localized, transient hot spots where hot, pressurized gas from a concentrated thermal event is flowing near the inner surface of the cell. Whether or not a cell transient hot spot perforates the cell wall or simply dissipates and leaves the cell casing intact depends on a number of factors. These factors can be divided into two groups; those that are based on the characteristics of the thermal event and those that are based on the physical qualities of the cell casing. Factors within the first group include the size and temperature of the hot spot as well as the duration of the thermal event and the amount of gas generated by the event. Factors within the second group include the wall thickness as well as the casing's yield strength as a function of temperature, heat capacity and thermal conductivity.

FIG. 2 illustrates the conventional approach to improving the failure resistance of a cell, where failure is defined as a thermally induced wall perforation. As shown, in cell 200 the thickness of casing 201 has been significantly increased, thereby improving the cell's failure resistance at the expense of cell weight. Assuming that cell mass is not an issue, which it is not for many consumer applications where only a few cells are used, the conventional approach to preventing wall perforations during thermal runaway is quite effective. Unfortunately, for those applications in which the battery pack may include hundreds or even thousands of cells, for example the battery pack of an electric vehicle, the added mass of this approach is very unattractive since performance is directly tied to mass. For instance, if the conventional approach only adds 4 grams per cell, for a battery pack with 10,000 cells, this increase adds up to 40 kg. Accordingly, for these applications, the conventional approach to improving cell failure resistance is unacceptable and an improved means is needed. The present invention provides such a means.

SUMMARY OF THE INVENTION

The present invention provides a means for inhibiting the propagation of thermal runaway within a plurality of batteries.

In at least one embodiment of the invention, a battery is provided comprised of a cell case with a first end closed by a cell case bottom and a second end comprised of a central open portion; an electrode assembly contained within the cell case with a first electrode electrically connected to the cell case; a cap assembly closing the central open portion, wherein a battery terminal of the cap assembly is electrically isolated from the cell case and electrically connected to a second electrode of the electrode assembly; and a layer of intumescent material interposed between the electrode assembly and an interior cell case surface. The intumescent material may be applied to a portion of the electrode assembly or applied to the interior cell case surface. The intumescent material may be selected to promote fire retardation while exhibiting minimal expansion upon reaching its SET temperature. The intumescent material may be comprised of a graphite-based intumescent material, a thermoplastic elastomer, a ceramic-based intumescent material, a vermiculite/mineral fiber based intumescent material, and/or an ammonium polyphosphate based intumescent material. The intumescent material may have a SET temperature in the range of 75° C. to 150° C.; alternately, in the range of 100° C. to 200° C.; alternately, in the range of 200° C. to 300° C.

A further understanding of the nature and advantages of the present invention may be realized by reference to the remaining portions of the specification and the drawings.

BRIEF DESCRIPTION OF THE DRAWINGS

FIG. 1 is a simplified cross-sectional illustration of a cell utilizing the 18650 form-factor;

FIG. 2 illustrates the cell shown in FIG. 1, modified to increase failure resistance in accordance with the prior art approach;

DESCRIPTION OF THE SPECIFIC EMBODIMENTS

In the following text, the terms "battery", "cell", and "battery cell" may be used interchangeably and may refer to any of a variety of different cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. It should be understood that identical element symbols used on multiple figures refer to the same component, or components of equal functionality. Additionally, the accompanying figures are only meant to illustrate, not limit, the scope of the invention and should not be considered to be to scale.

Throughout the following specification, the invention is described relative to cells using the 18650 form-factor. It should be understood, however, that the invention may also be applied to other cell designs, shapes, chemistries, form-factors and configurations while retaining the functionality of the present invention. For example, the application is equally applicable to prismatic and pouch cells.

The present inventors recognize the weight constraints placed on the batteries within a large battery pack and the factors that contribute to the initiation and growth of wall perforations during thermal runaway. Additionally, the present inventors recognize that once a cell enters into thermal runaway it is no longer viable, and therefore at this point the primary goal is to reduce the risk of the thermal runaway event affecting neighboring cells, potentially leading to the initiation of a cascading thermal runaway event. In recognition of these design parameters and goals, the intent of the present invention is to minimize the effects of thermal runaway on cells that are adjacent to the affected cell, thereby resisting thermal runaway propagation.

Figure 3:
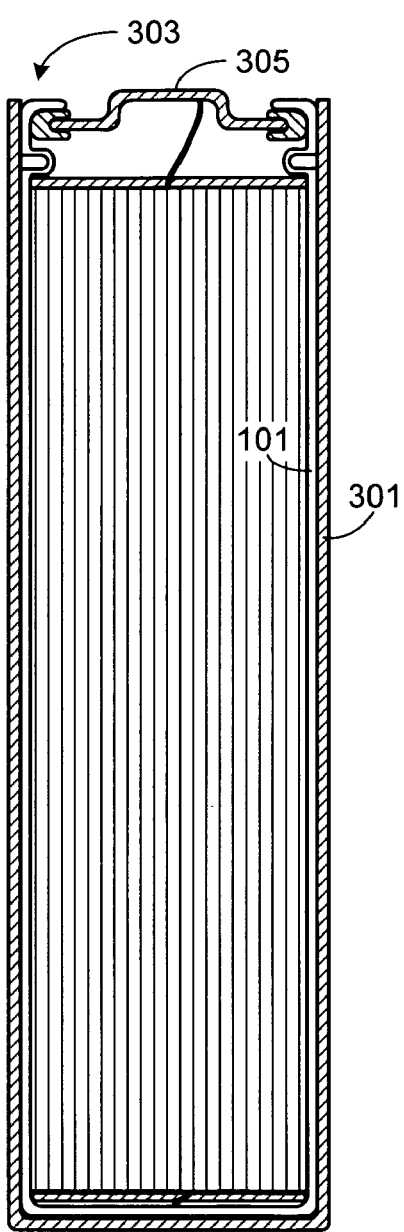
FIG. 3 illustrates a preferred embodiment of the invention utilizing a coating of an intumescent material applied to the outer surface of the battery casing.
Figure 4:
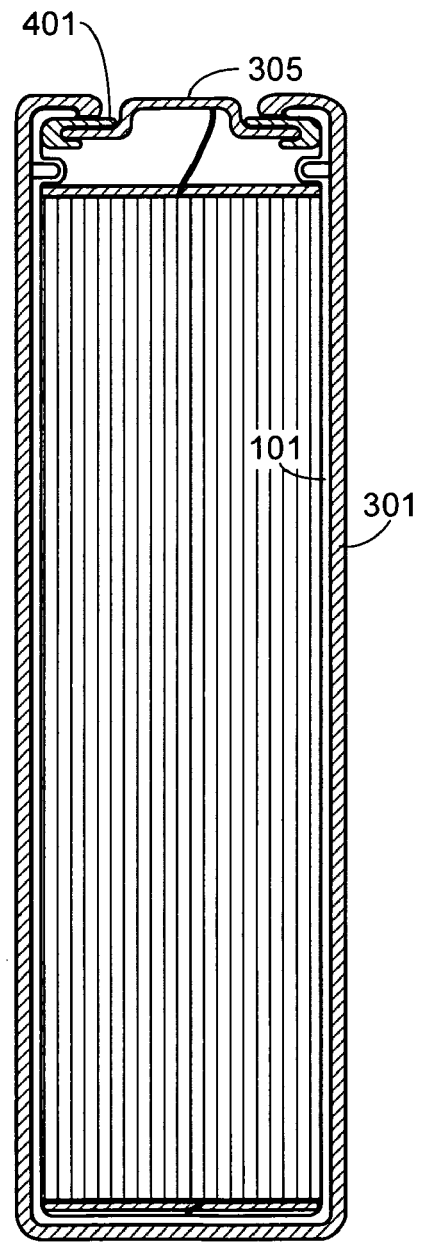
FIG. 4 illustrates a modification of the configuration shown in FIG. 3, the modified configuration including intumescent material applied to a portion of the cap assembly.

FIG. 3 illustrates a preferred embodiment of the invention in which the outer surface of the cell case is coated with a layer 301 of an intumescent material. Preferably and as illustrated, both the sidewalls and the bottom surface of cell case 101 are covered by layer 301. Alternately, only the sidewalls of cell case 101 are covered by layer 301. Layer 301 may be applied by painting the surface to be coated with a solution of the intumescent material, by dipping the cell into the solution of intumescent material, or by other means. In the illustration, upper cell surface 303 is uncoated. It should be understood, however, that this surface may be coated as long as the intumescent material does not cause a short between the terminals of the battery which, in this design, are comprised of the cell casing and terminal 305. Battery shorting may be prevented by using a non-electrically conductive intumescent material. Alternately, and as illustrated in FIG. 4, an electrical insulator 401 may be positioned to prevent shorting between the cell terminals due to the application of the intumescent material.

During thermal runaway, the exterior surface of the battery heats up, this heating process typically initiating at one or more transient hot spots (e.g., spot 121 in FIG. 1). During this process, intumescent layer 301 absorbs the excess heat via an endothermal chemical reaction. Once the intumescent material's activation temperature is reached, also referred to as the material's start expansion temperature or "SET", layer 301 will begin to expand. Typically material expansion begins near the transient hot spots, and then continues as the entire battery heats up past the SET temperature. After expansion, the intumescent material of layer 301 hardens to what is commonly referred to as a char.

The inventors have found that the use of an intumescent material applied directly to a cell as described above, or used in a configuration as described in detail below, provides significant resistance to the propagation of a thermal runaway event. In general, the intumescent material performs several functions when a cell begins to overheat. First, the intumescent material surrounding the cell absorbs the thermal energy generated during the thermal event, thereby helping to prevent a transient hot spot (e.g., spot 121 in FIG. 1) from perforating the cell casing by giving the cell sufficient time to reach thermal equilibrium. Second, once the SET temperature is reached, the intumescent material expands and provides a thermal barrier between the affected cell and neighboring cells. Third, once the intumescent material hardens into char, it helps to contain the affected cell, for example by preventing escaping gas or flames from impinging directly on an adjacent cell. Fourth, in some applications the intumescent material may be used to direct excess heat produced by an affected cell towards a heat removal means, such as a coolant conduit.

Figure 5:
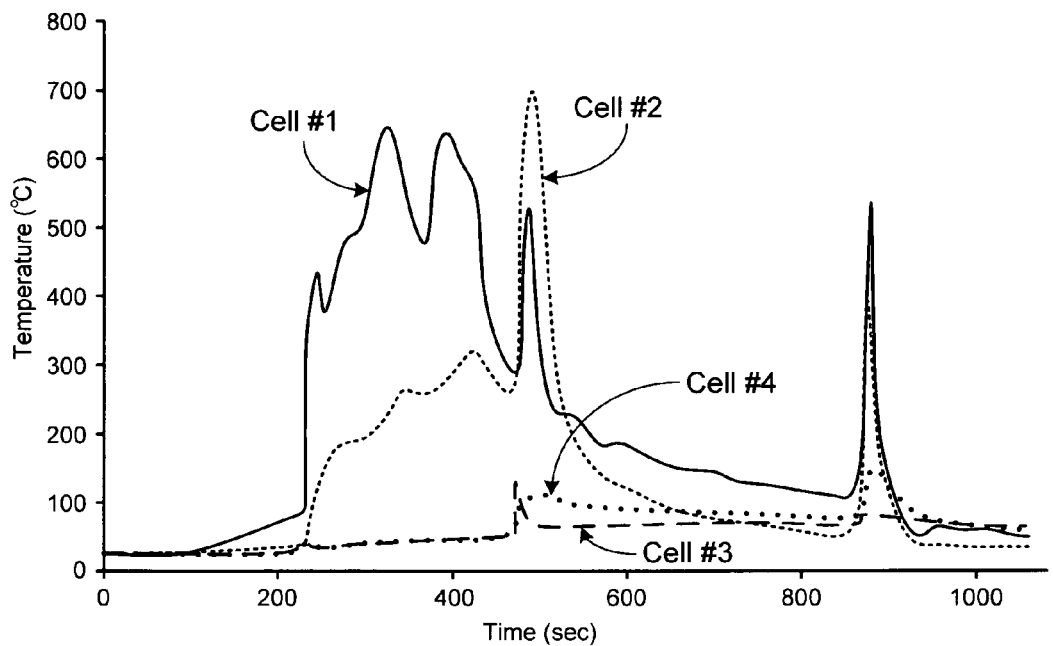
FIG. 5 graphically illustrates propagation of a thermal runaway event among a series of uncoated cells.
Figure 6:
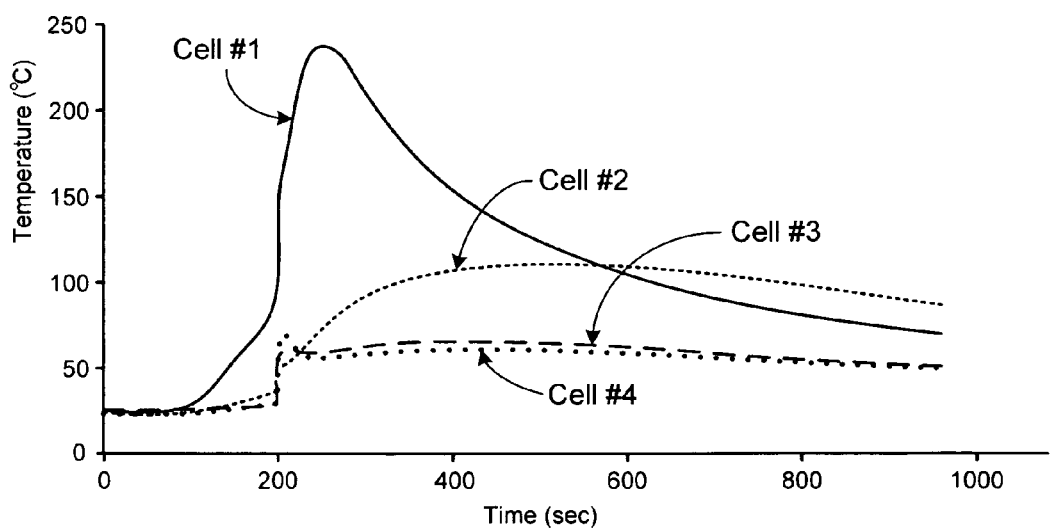
FIG. 6 graphically illustrates the non-propagation of a thermal runaway event among a series of cells coated with intumescent material.

In one test designed to determine the effects of applying an intumescent coating to the outer casing of a cell, two groups of cells were arranged in series. The first group of cells were untreated while each cell of the second group of cells had intumescent material applied to the outer cell casing. The cell-to-cell spacing was the same for both tests. In each test, the first cell of the group was forced into a thermal runaway event. The results of this test for the untreated cells, illustrated in FIG. 5, showed that within 3 to 4 minutes of the first cell undergoing thermal runaway, the next cell in line entered into thermal runaway. In contrast, and as shown in FIG. 6, the thermal runaway event did not propagate between adjacent cells for the intumescent coated cells. Additionally, FIG. 5 illustrates that uncoated cells will often undergo multiple thermal spikes as transient hot spots are formed at different locations within the cell, these transient hot spots clearly affecting neighboring cells. In the intumescent material coated cells, however, the thermal barrier created by the intumescent material prevents neighboring cells from being subjected to multiple thermal peaks. Rather, the external temperature presented to the neighboring cells in the intumescent coated group of cells peaks once, followed by a gradual dissipation of thermal energy until thermal equilibrium is reached. Note that the differences in the monitored temperatures, as reported in FIGS. 5 and 6, are due to the intumescent coating presenting a thermal barrier between the cell casing and the thermocouple.

Figure 7:
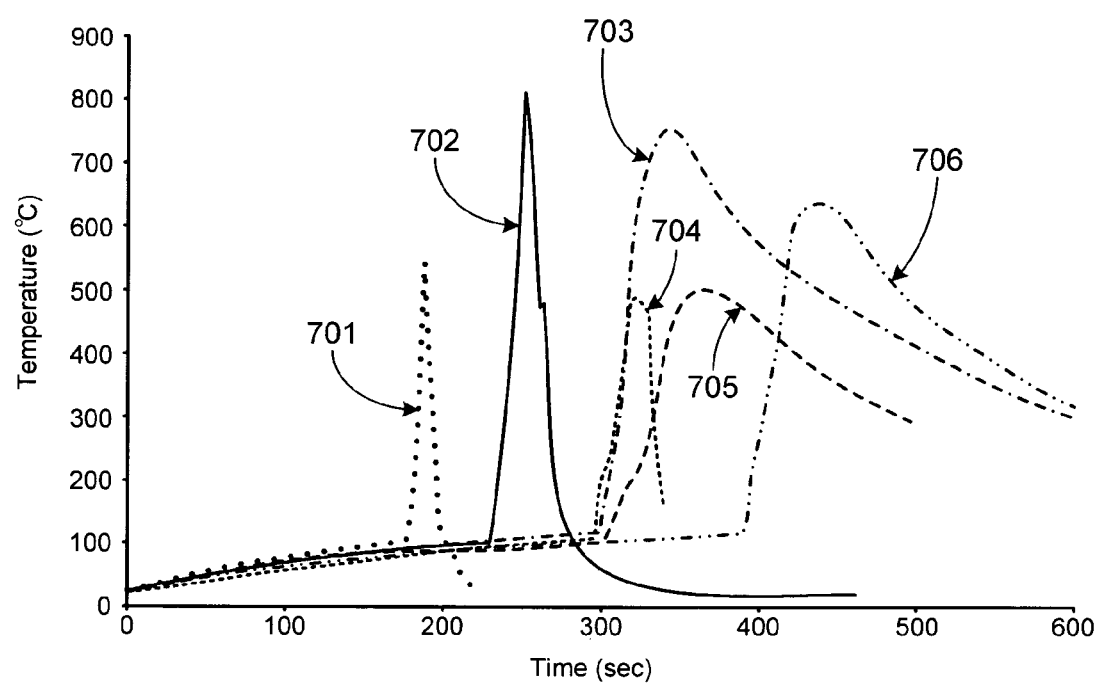
FIG. 7 graphically illustrates the ability of intumescent material to absorb thermal energy, thereby delaying the onset of thermal runaway.

As noted above, one of the benefits of the intumescent coating is its ability to absorb some of the thermal energy generated during a thermal event. By absorbing some of this energy, the onset of thermal runaway may be prevented, or at a minimum, delayed. FIG. 7 illustrates this aspect of the intumescent coating. Specifically, six cells were driven into thermal runaway, two of the cells being uncoated (i.e., curves 701 and 702) and four of the cells being coated with intumescent material (i.e., curves 703-706). While the same conditions were applied to each cell, thermal runaway for the coated cells was delayed by a minimum of 100 seconds.

The intumescent layers of the present invention, e.g., layer 301, may be fabricated from any of a variety of intumescent materials, for example, graphite-based intumescent material (e.g., expandable graphite in a polymeric binder), thermoplastic elastomers, ceramic-based intumescent material, vermiculite/mineral fiber based intumescent material, and ammonium polyphosphate based intumescent material. Preferably the selected intumescent material has a SET temperature in the range of 100° C. to 300° C., and more preferably in the range of 200° C. to 300° C. Alternately, the selected intumescent material may have a SET temperature in the range of 100° C. to 200° C., or in the range of 75° C. to 150° C. Preferably the selected intumescent material is biologically inert, thus insuring that if the intumescent covered cell is used in an application with limited airflow, the layer's activation will be a non-toxic event. Additionally, it is preferable that the selected intumescent material be comprised of a non-electrically conductive material.

Figure 8:
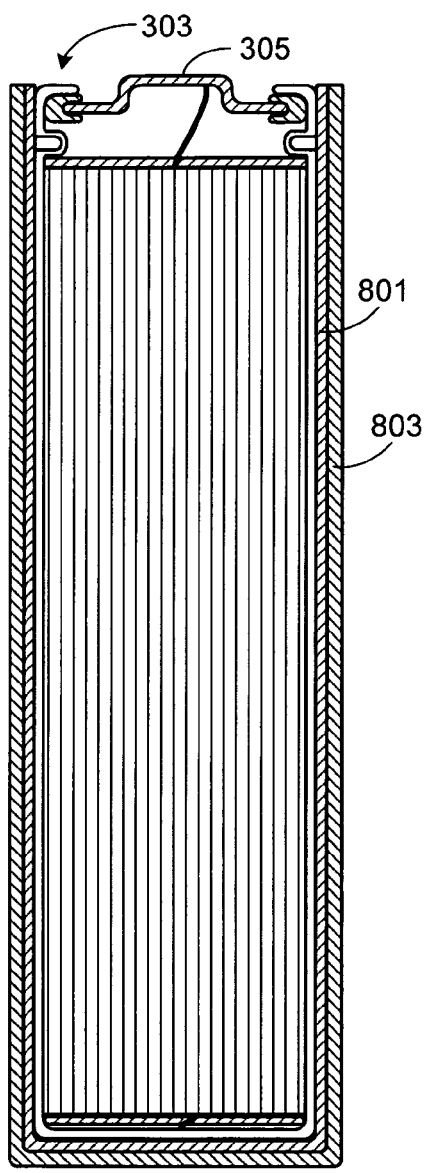
FIG. 8 illustrates an alternate embodiment utilizing a pair of intumescent layers.

FIG. 8 illustrates a slight modification of the embodiments shown in FIGS. 3 and 4. In the modified configuration, cell casing 101 is encased in a pair of intumescent material layers 801 and 803, the two intumescent material layers having different material characteristics. In a preferred configuration, layer 801, next to casing 101, has a higher heat capacity than outer intumescent material layer 803. As a consequence, inner intumescent layer 801 quickly absorbs excess thermal energy, thus helping the cell to maintain thermal equilibrium and preventing the formation of hot spots. Assuming the cell continues to heat up, as thermal energy passes through inner layer 801, the outer layer 803 absorbs the excess thermal energy. Using this two-layer approach further delays thermal energy being transferred from a cell undergoing a thermal event to neighboring cells, thereby providing further resistance to the propagation of a thermal runaway event throughout the battery pack. In an alternate configuration, layer 801 has a lower heat capacity than outer intumescent material layer 803.

It will be appreciated that other material characteristics may be varied between the two intumescent layers. For example, in one such embodiment inner layer 801 is designed to have a higher SET temperature than outer layer 803. As a result, during the onset of a thermal event (e.g., thermal runaway), outer intumescent layer 803 quickly begins to expand and provide a thermal barrier between the affected cell and neighboring cells. During this time, inner layer 801 absorbs thermal energy, but does not expand. Then, once the cell temperature reaches the higher SET temperature of inner layer 801, it too begins to expand. The expansion of layer 801, however, is somewhat constrained by the previously expanded layer 803, especially if the SET temperature of layer 803 is such that it has already turned to char. Typically the SET temperatures of layers 801 and 803 are optimized for the particular application, taking into account the cell chemistries, cell form-factor (e.g., 18650 cylindrical versus large format cells), cell spacing, etc. In an exemplary configuration, inner layer 801 has a SET temperature in the range of 200° C. to 300° C. while outer layer 803 has a SET temperature in the range of 100° C. to 200° C.

In another exemplary embodiment utilizing the two-layer configuration, the thermal conductivity between intumescent layers is varied, preferably such that outer intumescent layer 803 has a lower thermal conductivity than inner layer 801. One of the benefits of this configuration is that the inner intumescent layer 801 may be designed for optimal performance relative to withdrawing heat from the cell, while outer intumescent layer 803 may be designed to provide optimal thermal isolation between cells, thus further inhibiting the propagation of thermal energy between neighboring cells. In yet another embodiment, while outer layer 803 is designed to provide optimal thermal isolation between cells and thus is comprised of a low thermal conductivity intumescent material, inner layer 801 is selected to optimize its fire retardant properties. It will be appreciated that other combinations of intumescent material may be used.

It should be understood that although layers 801 and 803 are shown not covering upper cell surface 303, as previously noted relative to FIG. 4, intumescent material may cover the upper portion of the cell as long as either the intumescent material is not electrically conductive or precautions are taken to insure that the cell is not shorted due to the application of the intumescent material.

Figure 9:
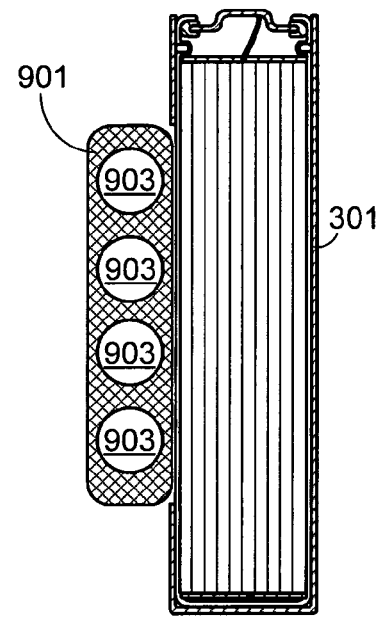
FIG. 9 illustrates a modification of the configuration shown in FIG. 3 in which the intumescent layer only covers a portion of the cell case, thereby providing improved thermal communication between the cell and the adjacent cooling conduit.
Figure 10:
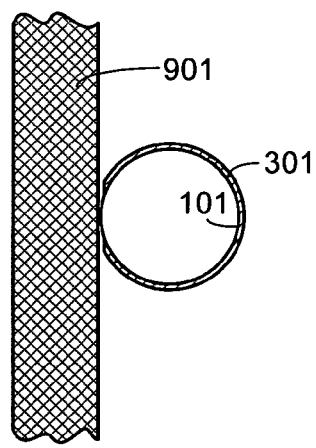
FIG. 10 provides a top view of the embodiment shown in FIG. 9.

In some applications, e.g., electric vehicles, the batteries within the battery pack are cooled using an active cooling system. The active cooling system may be comprised, for example, of one or more conduits mounted in close proximity to, or in contact with, the batteries within the battery pack. By pumping coolant through the conduits, heat is withdrawn from the batteries/battery pack. In such applications, the inventors have found that it is preferable to leave the portion of the cell case in proximity to, or in contact with, the cooling conduit free of the intumescent material. By keeping this portion of the cell uncoated, heat is more effectively withdrawn from the batteries. It should be understood that any of the previously described embodiments, e.g., those shown in FIGS. 3, 4 and 8, may be modified so that the layer or layers of intumescent material do not completely cover the portion of cell case 101 in proximity to, or in contact with, the cooling conduit. This aspect of the invention is illustrated in FIGS. 9 and 10 which provide cross-sectional and top views of the embodiment shown in FIG. 3, modified to take into account cooling conduit 901. In these illustrations, cooling conduit 901 includes three coolant flow channels 903. Intumescent layer 301 is configured to leave the portions of cell case 101 in proximity to, or contact with, conduit 901 uncoated by intumescent material. It will be appreciated that the other embodiments of the invention may be similarly modified.

Figure 11:
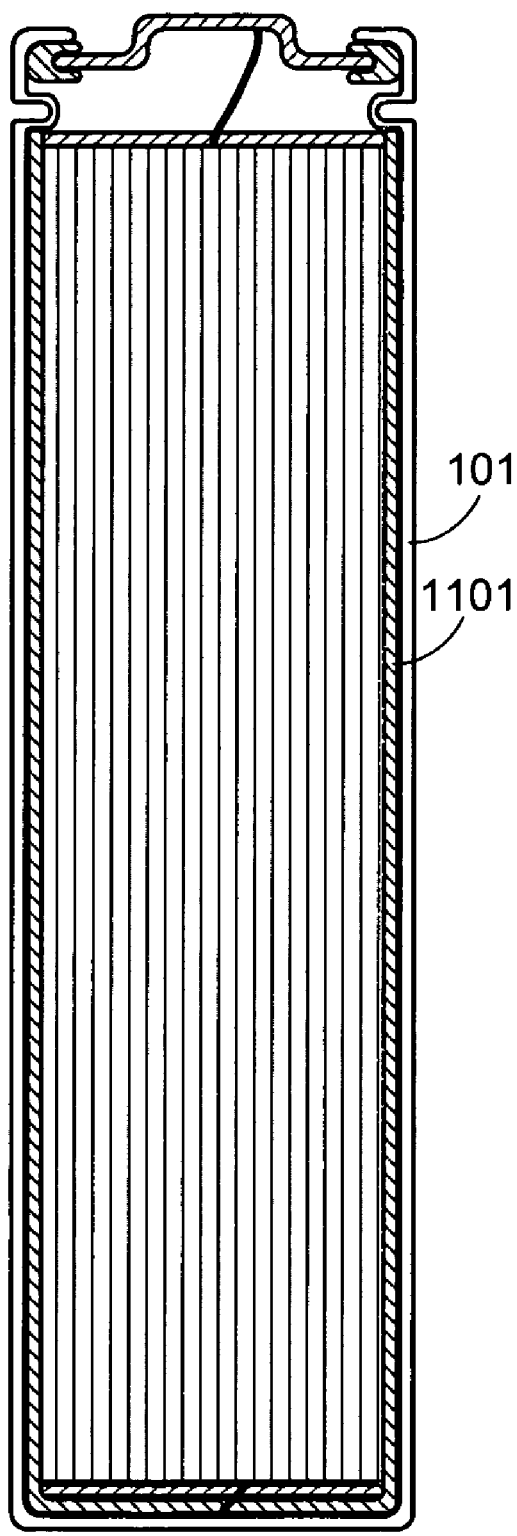
FIG. 11 illustrates an alternate embodiment utilizing a layer of intumescent material interposed between the inner cell casing surface and the electrode jellyroll.

In a modification of the previously described embodiments, a layer of intumescent material 1101 is interposed between the inside wall surface of cell casing 101 and the exterior surface of the electrode assembly (FIG. 11). Intumescent material layer 1101 absorbs excess thermal energy, thereby minimizing the transfer of thermal energy from within the electrode assembly, e.g., a transient hot spot, to the outer cell casing 101. As layer 1101 absorbs thermal energy, and once its SET temperature is reached, it expands to the extent allowed by the cell casing. Due to the constraints placed on the expansion of layer 1101 by cell casing 101, preferably layer 1101 is selected for optimal fire retardant properties while minimizing the extent to which the layer expands upon reaching its SET temperature. Preferably layer 1101 expands by less than 25 percent upon reaching its SET temperature; alternately, by less than 50 percent upon reaching its SET temperature; alternately, by less than 100 percent upon reaching its SET temperature.

Layer 1101 is formed by coating the inside surface of case 101 with the selected intumescent material, this coating/deposition step being performed prior to assembling the electrode assembly within the cell casing. Alternately, the exterior surface of the electrode assembly may be coated, for example by a dipping process with the selected intumescent material, this coating step being performed prior to assembling the electrode assembly within the cell casing. Alternately, the intumescent material may be applied to a carrier substrate which is then wrapped around the outside surface of the electrode assembly before assembly within the cell casing. Alternately, the intumescent material may be applied to a secondary carrier substrate in the form of a sleeve, the intumescent coated sleeve then being inserted into the cell case prior to final assembly.

In an alternate embodiment of the invention, in addition to coating the exterior surfaces of the cells, all other components and surfaces within the battery pack are coated with intumescent material. Although it is possible to electrically isolate the various electrical components (e.g., cells, interconnects, etc.) prior to coating, preferably an electrically non-conductive intumescent material is used for this embodiment, thereby eliminating this isolation step and simplifying fabrication.

Figure 12:
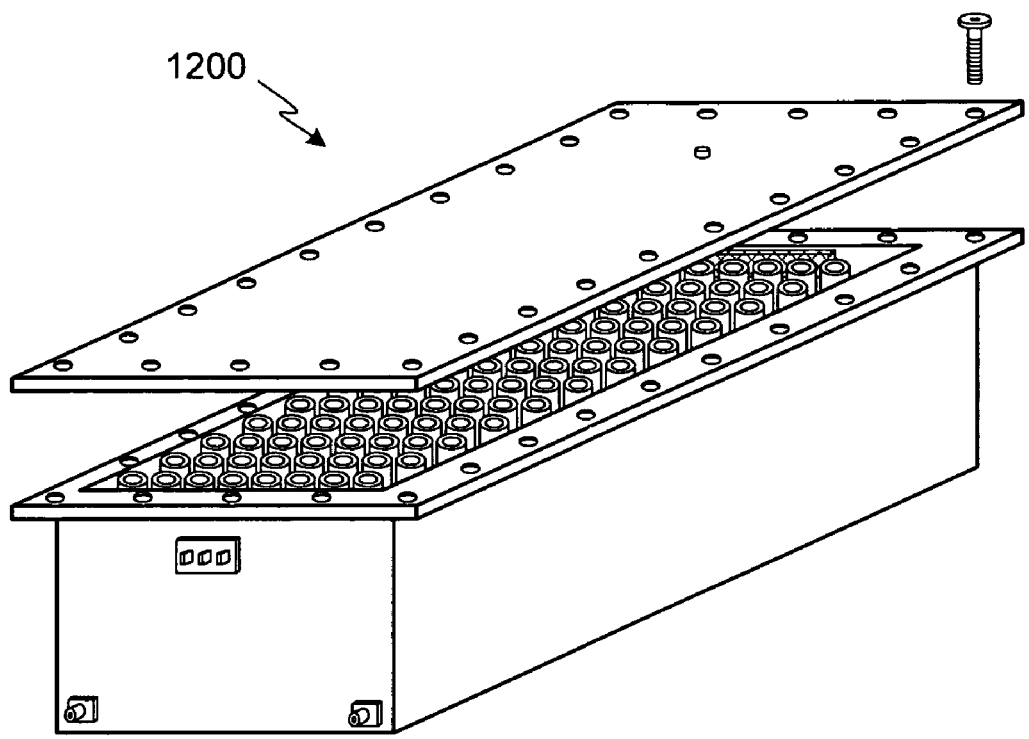
FIG. 12 illustrates an exemplary battery pack in which the internal surfaces of the battery pack, and the external surfaces of the components contained within the battery pack, are coated with intumescent material.

An exemplary battery pack 1200 is shown in FIG. 12. Further description of this battery pack is provided in co-pending U.S. patent application Ser. No. 12/386,684, filed Apr. 22, 2009, the entire disclosure of which is incorporated herein for any and all reasons. It will be appreciated that the present invention may be applied equally well to other battery packs, and battery pack 1200 is simply intended to illustrate the invention. In particular it will be understood that battery packs can take any of a variety of forms, depending upon such factors as the number of cells to be housed; the size and shape of the cells; the manner in which the cells are mounted within the battery pack; the manner in which the battery pack is to be mounted or held in place; the type of cell interconnects used within the pack as well as the type of interconnects used between the battery pack and the application for which it is intended; the type of cell cooling employed (e.g., liquid, etc.); and sealed versus unsealed battery pack. Regardless of the battery pack configuration, the inventors have found that coating the inside of the battery pack, for example battery pack 1000, with intumescent material offers a number of advantages over an untreated battery pack. It will be understood that during the coating process, any exposed surfaces are coated with the intumescent material. These surfaces may include not only the inside battery pack walls, but exposed cell surfaces, cooling components, and any other components contained within the battery pack. As previously noted, some surfaces of the cells may be left uncoated due to the proximity of cooling conduits. By coating the entire inside of the battery pack, any fires initiated in the battery pack, for example due to a cell undergoing thermal runaway, are typically contained within the battery pack. As a result, collateral damage is dramatically reduced. Additionally, the inventors have found that completely coating the inside of the battery pack further reduces the risk of thermal runaway propagation within the cells of the pack.

In at least one embodiment, the battery pack is fully assembled prior to coating with intumescent material. Thus, for example, the cells are integrated within the pack, the cooling system is installed, and the battery interconnects are coupled prior to coating. This procedural order insures that components that need to be in contact with one another or in close proximity to one another, such as cooling conduits and cell surfaces, are not separated by intumescent material. After pack assembly, the inside surfaces of the battery pack as well as the exposed external surfaces of the various components located within the pack are coated, for example using a spraying operation or, as preferred, filling the battery pack with a solution of the intumescent material and then discarding the excess intumescent material. Discarding excess intumescent material can be accomplished by simply turning the battery pack over and letting excess material drip off the coated surfaces and out of the battery pack. After coating and removal of excess material, the intumescent material is allowed to dry.

In a modification of the previously described embodiment, the external surfaces of the battery pack are coated, along with the inside surfaces, with intumescent material. Coating both the internal and external surfaces of the battery pack simplifies fabrication since the entire pack, once assembled, may simply be dipped in a tank of suitable material and then removed, thereby allowing the excess material to drip off the surfaces prior to drying.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A battery, comprising:
   a cell case having an outer surface, a first end and a second end, wherein said first end is closed by a cell case bottom, and wherein said second end is comprised of a central open portion;
   an electrode assembly contained within said cell case, wherein a first electrode of said electrode assembly is electrically connected to said cell case;
   a cap assembly mounted to said cell case, said cap assembly closing said central open portion of said second end, wherein said cap assembly further comprises a battery terminal electrically isolated from said cell case and electrically connected to a second electrode of said electrode assembly; and
   a layer of an intumescent material interposed between said electrode assembly and an interior surface of said cell case.

2. The battery assembly of claim 1, wherein said intumescent material is selected from the group of intumescent materials consisting of graphite-based intumescent materials, thermoplastic elastomers, ceramic-based intumescent materials, vermiculite/mineral fiber based intumescent materials, and ammonium polyphosphate based intumescent materials.

3. The battery assembly of claim 1, wherein said intumescent material is a fire retardant.

4. The battery assembly of claim 1, wherein said intumescent material expands by less than 25 percent upon reaching its start expansion temperature.

5. The battery assembly of claim 1, wherein said intumescent material expands by less than 50 percent upon reaching its start expansion temperature.

6. The battery assembly of claim 1, wherein said intumescent material expands by less than 100 percent upon reaching its start expansion temperature.

7. The battery assembly of claim 1, wherein said intumescent material coats at least a portion of said electrode assembly.

8. The battery assembly of claim 1, wherein said intumescent material coats said interior surface of said cell case.

9. The battery assembly of claim 1, wherein said intumescent material has a start expansion temperature in the range of 75° C. to 150° C.

10. The battery assembly of claim 1, wherein said intumescent material has a start expansion temperature in the range of 100° C. to 200° C.

11. The battery assembly of claim 1, wherein said intumescent material has a start expansion temperature in the range of 200° C. to 300° C.

* * * * *